UNITED STATES PATENT OFFICE.

RUSSELL WILLIAM MUMFORD, OF NEW YORK, N. Y., ASSIGNOR TO REFINING PRODUCTS CORPORATION, OF WILMINGTON, DELAWARE, A CORPORATION OF DELAWARE.

PROCESS OF MAKING PURIFYING PREPARATIONS.

1,314,204.     Specification of Letters Patent.     Patented Aug. 26, 1919.

No Drawing.     Application filed March 27, 1918. Serial 225,067.

*To all whom it may concern:*

Be it known that I, RUSSELL WILLIAM MUMFORD, a citizen of the United States, residing at New York, in the county of New York and State of New York, have invented certain new and useful Improvements in Processes of Making Purifying Preparations, of which the following is a specification.

This invention relates to processes of making purifying preparations; and it comprises a method of making a granular or powdery decolorant having also the power of clarifying liquids and comprising kieselguhr containing incorporated therein a small amount of highly active decolorizing material and in admixture with a further amount of fine grained decolorizing carbon wherein kieselguhr is impregnated with ammoniacal tar or an equivalent material and, usually, is admixed with a further amount of material such as peat or brown coal capable of yielding decolorizing carbon, and is then charred through a slowly ascending temperature range ending above 600° C.; all as more fully hereinafter set forth and as claimed.

In the purification of liquids for technical purposes, as in treating cane juice, molasses, syrup, glycerin, oil, etc., there are two types of purification usually desired. It is desirable to remove dissolved coloring matters and other impurities which, though not colored, are detrimental to the quality of the material; and it is also desirable to remove turbidity caused by finely divided matters in a state of suspension or semi-solution; what are called "colloidal suspensions." The purified liquid should not only be light colored, but absolutely clear or "bright." In practice, two types of material are often used in succession. For the decolorizing, very finely divided carbons made from vegetable sources are in use. These preparations have a high adsorbing power and are active in removing coloring matter and other dissolved substances from the solutions. In order to heighten this power, which is one depending on surface action, it is the custom to make these powders very fine. They have no action, or very little, on suspended matters, or matters in a state of quasi-solution, and do not usually give bright or clear liquids. In fact, because of the fineness of the carbons, they often contribute turbidity, giving a blackish cloud to the solution. In order to remove this turbidity in the solution, it is often the practice to follow the treatment with the carbon by a treatment with a clarifying agent. For this purpose kieselguhr is often used. Kieselguhr or diatomaceous earth (tripoli) is composed of highly cellular microscopic silicious skeletons of micro-organism. It has little or no decolorizing power but has the power of clarifying liquids by attracting to itself suspended matters; a property connected in some way with its microscopic structure. Kieselguhr is often used for clarifying turbid liquids for this reason and is often used as an after-treatment after decolorizing with vegetable carbons.

It is the object of the present invention to make a composite preparation able to effect both decolorization and clarification; and to this end I treat kieselguhr so as to incorporate within its structure a certain amount of very porous decolorizing carbon. Kieselguhr is able to take up a certain amount of porous carbon without forfeiting the porosity of its own to which it owes its clarifying action and if the carbon so incorporated be produced in a proper manner, it will have a high decolorizing power. Further, the preparation may contain in addition to the carbon-impregnated kieselguhr particles, a certain amount of decolorizing carbon in mechanical admixture.

In another application, Serial No. 167,971, I have described and claimed a process of making decolorizing carbon having also a clarifying action wherein vegetable matters of various kinds are heated in a vented retort through a slowly ascending range of temperature ending above 600° C. In so heating the material, the gases and vapors which are evolved in the first charring action are given opportunity to escape from the char prior to themselves decomposing under the influence of heat with deposition of carbon. In order to secure an effective decolorizing carbon of not too fine a structure, it is necessary that it shall possess open pores representing as nearly as may be the original structure of the material from which it was made; and that these pores shall not be clogged and obstructed by what may be called secondary carbon resulting from the charring in the pores of evolved gases and vapors. In the stated application, in order to secure still more positively this effect, I have described the incorporation into the material prior to charring of a mineral spacing agent, such as finely ground dolomite, etc., which has, together with several other functions that of spacing away the charring particles from each other and thereby facilitating the removal of vapors, tar, etc. Material so made is usually treated after completing the charring in such manner as to remove the mineral spacing agent.

I have found that I may use kieselguhr as the mineral spacing agent in securing this effect and in so doing I do not remove the kieselguhr afterward, since by letting it remain a compound decolorizing and clarifying agent of great efficiency may be procured. Indeed so desirable is the kieselguhr in this relation, that I may merely treat it in such a manner as to impregnate it with decolorizing carbon without producing particles of decolorizing carbon between the kieselguhr particles.
In one embodiment of the present invention, making a material rich in kieselguhr and designed to have the clarifying function in high degree, I do not mix any vegetable particles, such as sawdust, peat or brown coal with the kieselguhr, but simply work the kieselguhr into a dough with wet gas tar. This gas tar should be material still containing ammonia. Or I may advantageously use gas liquor containing ammonia and more or less suspended or dissolved tar. On incorporating tar or gas liquor with the kieselguhr, the tar enters the pores, if not during the first incorporation, then during the first stages of heating, and on charring the kieselguhr in the described manner I produce a preparation which is virtually a carbon-impregnated kieselguhr; that is, all the granules of the material are kieselguhr granules and all the decolorizing carbon present is within these kieselguhr granules. In so doing, it is desirable to limit the amount of carbon, since the pores of the kieselguhr must not be too much clogged; they should be, so far as possible, merely lined with carbon.

In another embodiment, I work the kieselguhr into a dough with tar or the like as above and then mix with this dough a certain amount, say an equal amount, of brown coal or lignite rich in volatile matters; this coal being in a finely powdered state, say, 80 to 150 mesh. This dough of brown coal and tar-impregnated kieselguhr is formed into pellets or lumps and charred in a vented retort in the manner previously described; that is, heated so as to produce a slowly ascending temperature ending finally somewhere above 600° C. In the heating any usual type of furnace or retort may be employed. It is often useful to blow through the retort a current of steam to remove vapors. Instead of using a retort it is a useful expedient to place the material to be charred in thin layers in shallow iron pans and advance these charged pans, which may be covered, through a tunnel-like furnace heated by "surface combustion" burners. "Surface combustion" as it is now understood, is the type of combustion produced by mixing air and gas in the theoretical proportions and allowing them to burn in the surface of a porous refractory block or pile of granules. In so doing, there being no excess oxygen, the products of combustion have little or no oxidizing power on the carbon at the temperatures here contemplated and do not waste it away and do not interfere with its production.

After the compound material is made in the manner described, it is quickly cooled to prevent spontaneous combustion. It may be dumped into water. I usually wash it and then dry. In drying in a rotary tube, the waste gases from the charring furnace or dry steam may be usefully employed.

In many embodiments of the present invention, I mix kieselguhr and carbonaceous material with a little milk of lime or a mixture of milk of lime and soluble phosphate. The excess of lime may be removed finally by treatment with acid or sedimentation.

In lieu of using ammoniacal gas tar, I may use other tarry materials, such as asphalt, wood tar, etc., but I find the use of the ammoniacal gas tar more advantageous, since it leaves a residue of nitrogenous carbon (that is carbon containing nitrogen in combined form) which has very active decolorizing powers.

What I claim is:
1. In the manufacture of purifying agents, the process which comprises impregnating kieselguhr with carbonaceous matter and slowly charring through a range of temperatures ending above 600° C., the circumstances of charring being such as to facilitate ready escape of vapors produced in the charring.

2. In the manufacture of purifying agents, the process which comprises impregnating kieselguhr with tarry matter and slowly charring through a range of temperature ending above 600° C., the circumstances of charring being such as to facilitate ready escape of vapors produced in charring.

3. In the manufacture of purifying agents, the process which comprises impregnating kieselguhr with ammoniacal gas tar and slowly charring through a range of temperature ending above 600° C., the circumstances of charring being such as to facilitate ready escape of vapors produced in charring.

4. In the manufacture of purifying agents, the process which comprises impregnating kieselguhr with gas liquor containing ammonia and suspended dissolved tarry matter and slowly charring the mixture in a vented retort through which a draft current of dry steam is passed to facilitate removal of vapors, and continuing the heating through a range of temperatures ending above 600° C.

5. In the manufacture of purifying agents, the process which comprises working kieselguhr and powdered carbonaceous matter together into a dough with a tarry matter and slowly carbonizing through a range of temperatures ending above 600° C., the circumstances of charring being such as to facilitate ready escape of vapors produced in charring.

6. In the manufacture of purifying agents, the process which comprises working kieselguhr and powdered vegetable carbon together into a dough with ammoniacal tarry matter and slowly carbonizing through a range of temperatures ending above 600° C., the circumstances of charring being such as to facilitate ready escape of vapors produced in charring.

In testimony whereof, I affix my signature hereto.

RUSSELL WILLIAM MUMFORD.